US012743822B2

(12) United States Patent
Kettl et al.

(10) Patent No.: US 12,743,822 B2
(45) Date of Patent: Sep. 22, 2026

(54) DYNAMIC GENERATION OF DATA OBJECTS USING SMART SAFETY GLASSES

(71) Applicant: Procore Technologies, Inc., Carpinteria, CA (US)

(72) Inventors: Aaron Kettl, Austin, TX (US); Bharath Hariharan, Redwood City, CA (US); David Borden, Austin, TX (US); Sharmishtha Gupta, Fremont, CA (US)

(73) Assignee: Procore Technologies, Inc., Carpinteria, CA (US)

(*) Notice: Subject to any disclaimer, the term of this patent is extended or adjusted under 35 U.S.C. 154(b) by 84 days.

(21) Appl. No.: 18/892,193

(22) Filed: Sep. 20, 2024

(65) Prior Publication Data

US 2026/0087683 A1 Mar. 26, 2026

(51) Int. Cl.

| | |
|---|---|
| ***G06T 19/00*** | (2011.01) |
| ***G06T 11/00*** | (2006.01) |
| ***G06V 20/20*** | (2022.01) |
| *G06N 3/08* | (2023.01) |
| *G06T 7/00* | (2017.01) |
| *G06T 19/20* | (2011.01) |

(52) U.S. Cl.

CPC ............ *G06T 11/00* (2013.01); *G06T 19/006* (2013.01); *G06V 20/20* (2022.01); *G06N 3/08* (2013.01); *G06T 7/0002* (2013.01); *G06T 19/20* (2013.01)

(58) Field of Classification Search

None

See application file for complete search history.

(56) References Cited

U.S. PATENT DOCUMENTS

| | | | | |
|---|---|---|---|---|
| 2018/0181810 | A1 | 6/2018 | Jhawar et al. | |
| 2019/0205340 | A1 | 7/2019 | Jhawar et al. | |
| 2021/0034041 | A1 | 2/2021 | Fang et al. | |
| 2021/0272367 | A1* | 9/2021 | Richter | G06N 3/092 |
| 2022/0119233 | A1 | 4/2022 | Brenner et al. | |
| 2023/0343043 | A1 | 10/2023 | Greunke | |

(Continued)

OTHER PUBLICATIONS

International Searching Authority, PCT International Search Report and Written Opinion, PCT International Application No. PCT/US2025/046793, Mar. 5, 2026, 9 pages.

(Continued)

*Primary Examiner* — Joni Hsu

(74) *Attorney, Agent, or Firm* — Lee Sullivan Shea & Smith LLP

(57) ABSTRACT

A smart wearable device for hands-free data capture facilitates documentation of real-time observations and creation of new data objects within a software application based on the observations. Image data depicting one or more physical objects observed by a user of the smart wearable device, voice data indicating a user request related to the physical objects depicted in the image data, and contextual information related to the user and the physical objects depicted in the image data, are used to generate a prompt for input to a generative AI model that is to respond to the user request. Based on the prompt, the generative AI model outputs an application-specific command that is to be carried out by a given software tool of the software application, such as a command to create a new data object of a given type within the software application.

20 Claims, 8 Drawing Sheets

(56) References Cited

U.S. PATENT DOCUMENTS

2024/0391488 A1* 11/2024 Yeh ........................ G06V 20/56
2026/0003852 A1* 1/2026 Ceker ................. G06F 16/2365

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

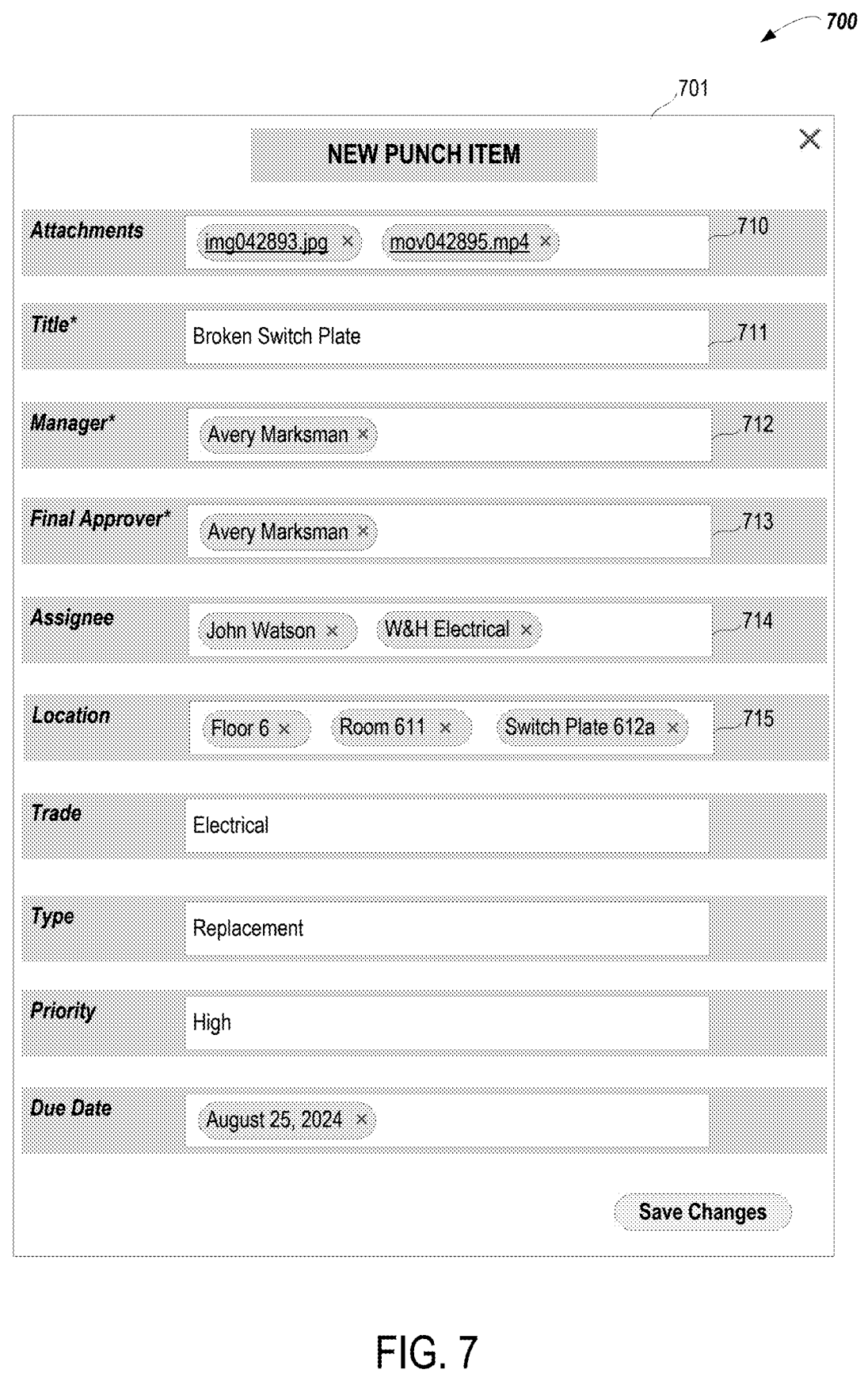

700

701

NEW PUNCH ITEM

Attachments img042893.jpg × mov042895.mp4 × 710

Title* Broken Switch Plate 711

Manager* Avery Marksman × 712

Final Approver* Avery Marksman × 713

Assignee John Watson × W&H Electrical × 714

Location Floor 6 × Room 611 × Switch Plate 612a × 715

Trade Electrical

Type Replacement

Priority High

Due Date August 25, 2024 ×

Save Changes

FIG. 7

DYNAMIC GENERATION OF DATA OBJECTS USING SMART SAFETY GLASSES

BACKGROUND

Construction projects are complex undertakings that involve intensive planning and review. Quality checks and observation procedures are conducted and logged consistently in efforts to ensure that a construction project is progressing as planned and to document any potential issues as early as possible so that they can be addressed in a timely manner. To this end, improved software tools that facilitate documenting items and situations identified and observations made at a construction site are desired.

Overview

As mentioned above, a construction project typically involves quality checks and observations of various different types, which are conducted by one or more construction professionals who inspect and observe a construction site by physically walking around the site and documenting any observed issues. Typically, existing workflows for capturing data and documenting observations made on a construction site involve carrying a hand-held device (e.g., a smartphone or tablet) and then using the hand-held device to document each observed issue, which may involve taking pictures and/or videos of items, objects, or situations observed at the construction site, writing notes regarding the observations made, and perhaps also entering other data required to complete the documentation. However, this approach poses several challenges.

For instance, as one example, using a hand-held device to document observations on-site diverts attention from a construction professional's immediate surroundings, which could cause safety issues. As another example, conducting a physical inspection and documenting observations involves repeatedly lifting and handling a hand-held device to capture and enter data, which may cause physical strain on a construction professional and thereby increase a risk of an accident. As yet another example, manual data entry, especially while wearing construction safety equipment such as gloves that need to be removed for using a hand-held device (e.g., touchscreen) and walking around a construction site can be prone to data inaccuracies. Further yet, as another example, using a hand-held device to document observations on-site is cumbersome and inconvenient, requiring a construction professional to carry the hand-held device on their person while walking through the site (which may limit the construction professional's utility) and stop to document each observed issue (which may also involve removing safety equipment such as gloves in order to access a touchscreen of the hand-held device, and then replacing the safety equipment after documenting a given issue). Further still, as another example, the hand-held device may not be integrated with the appropriate software tools that will ultimately be used for completing documentation, in which case the construction professional may need to complete documenting observed issues at a later time, either off-site or using a different computing device, or both.

For example, even after data is collected on-site using existing methods as described above, additional work is typically required to complete documenting observed issues. For instance, construction professionals typically need to access a construction management software application to upload data collected on-site (e.g., images, videos, etc.) and generate tasks related to observed issues. However, this may not be possible while collecting such data on-site with the hand-held device. For instance, the hand-held device may not be integrated with the construction management application. In these situations, the construction professional might take notes in a basic note-taking application, which must later be transferred to a specific tool in a construction management software application that is installed on a desktop computing device in a construction trailer but is not installed locally on the hand-held device. Even if the hand-held device is integrated with the construction management application, uploading captured data to the correct software tool(s) provided by the construction management application and then generating related tasks as needed may be too cumbersome via the hand-held device. For example, for each observed issue, the construction professional may need to identify an appropriate software tool provided by the construction management application that will facilitate resolution of the observed issue and then select an option to create a new data object of a given type, which may involve filling in various data fields for the new data object, uploading relevant media content captured on-site, and assigning the new data object to a responsible party, among other actions. Moreover, attempting to complete such documentation on-site is not only time-consuming and inefficient, but leads to distraction and reduced situational awareness, which poses safety risks to the construction professional.

To address these and other issues, disclosed herein is a new hardware and software technology solution for hands-free capture of data based on live observations, documentation of the observations, and creation of new data objects within a construction management software application. In the discussion below, the disclosed technology will be described in the context of capturing data associated with a construction project, documenting objects and events observed on a construction site, and creating data objects within a construction management software application. However, it should be understood that the disclosed technology may be employed in a variety of other possible ways and across a variety of other industries.

The disclosed technology provides a new hardware-based wearable device for facilitating hands-free data capture and new software-based techniques for facilitating documentation of observed issues and creation of new data objects within a construction management software application. Advantageously, as will be described in more detail below, the disclosed technology provides hardware and software technology improvements over existing workflows for data capture, documentation, and creation of new data objects and tasks related to a construction project by enabling construction professionals on a construction site to use hands-free data capture and commands (e.g., voice commands) to document construction-site progress, incidents, and safety concerns directly into the construction management software application. The disclosed technology aims to streamline documentation, improve construction-site communication, and enhance safety management, setting a new standard for integrating wearable technology in the construction industry.

Accordingly, in one aspect, disclosed herein is a method for facilitating documentation of live observations made on a construction site that involves (1) obtaining, via a sensor system of a wearable device, (i) image data depicting one or more objects associated with a construction project and (ii) voice data indicating a request related to the one or more objects depicted in the image data, (2) determining contextual data related to the image data, (3) based on the voice data, identifying the request, wherein the request comprises a request to generate a data object of a given type within a construction management software application, (4) based on the image data, the contextual information, and the request, generating a prompt for input to a generative AI model, (5) inputting the prompt to the generative AI model, (6) based on the prompt, generating, via the generative AI model, a command for the construction management software application to generate the data object of the given type, wherein the data object of the given type comprises data related to the one or more objects depicted in the image data, (7) executing the command via the construction management software application and thereby generate the data object of the given type, and (8) causing a representation of the data object of the given type to be displayed via an end-user device.

In another aspect, disclosed herein is a wearable device that includes a network interface, at least one processor, at least one non-transitory computer-readable medium, and program instructions stored on the at least one non-transitory computer-readable medium that are executable by the at least one processor to cause the wearable device to carry out one or more of the functions disclosed herein, including but not limited to the functions of the foregoing method.

In yet another aspect, disclosed herein is a computing system that includes at least one network interface, at least one processor, at least one non-transitory computer-readable medium, and program instructions stored on the at least one non-transitory computer-readable medium that are executable by the at least one processor to cause the computing system to carry out one or more of the functions disclosed herein, including but not limited to the functions of the foregoing method.

Further, in another aspect, disclosed herein is a computing platform that includes a network interface, at least one processor, at least one non-transitory computer-readable medium, and program instructions stored on the at least one non-transitory computer-readable medium that are executable by the at least one processor to cause the computing platform to carry out one or more of the functions disclosed herein, including but not limited to the functions of the foregoing method.

Further still, in another aspect, disclosed herein is a non-transitory computer-readable storage medium that is provisioned with program instructions that, when executed by at least one processor, cause a computing device to carry out one or more of the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 7 depicts an example user interface view including a representation of a new data object that may be generated in accordance with aspects of the disclosed software technology.

Figure 1:
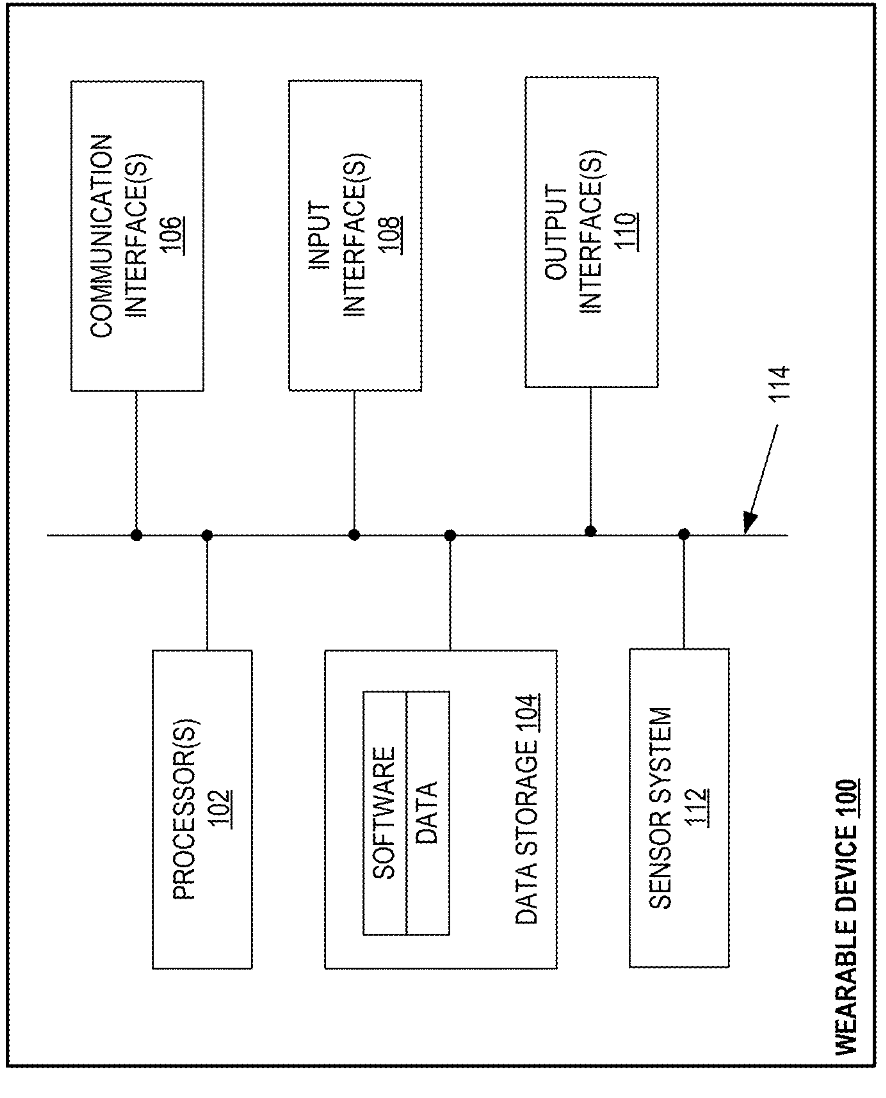
FIG. 1 depicts a structural diagram including structural components that may be included in an example wearable device that is configured to carry out one or more functions in accordance with aspects of the disclosed software technology.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

In line with the discussion above, disclosed herein is new hardware and software technology for hands-free capture of data based on live observations, documentation of the observations, and creation of new data objects hosted by a back-end computing platform. The disclosed technology provides new hardware and software technology including a wearable device that is capable of hands-free data capture and techniques for facilitating documentation of observations made on a construction site, creation of new data objects, and completion of tasks associated with a construction project based on data captured via one or more hardware components of the wearable device.

The data collected via the disclosed wearable device may be used, more or less in real time, to generate prompts for one or more generative artificial intelligence (AI) models. In general, a prompt may include information indicating incoming image data, voice data, or a combination of both, in conjunction with other contextual data (e.g., information associated with a user account, a construction project (e.g., project phase status, project scheduling information, etc.), a location associated with the construction project, etc.). Based on the prompt, the generative AI model(s) may output an application-specific command, such as a command that causes creation of new data objects, a command that facilitates completion of a project-related task, or a command that causes a combination thereof, among other possibilities.

The software technology for carrying out the functionality disclosed herein may be incorporated into one or more software applications that may take any of various forms. As one possible implementation, the disclosed software technology may be incorporated into a software as a service ("SaaS") application that includes both front-end software running on one or more computing devices (e.g., a wearable device, an end-user device) that are accessible to individuals associated with construction projects (e.g., contractors, subcontractors, project managers, architects, engineers, designers, etc., each of whom may be referred to generally herein as a "construction professional"), and back-end software running on a back-end computing platform (which may also be referred to as a "cloud" platform) that interacts with and/or drives the front-end software, and which may be operated (either directly or indirectly) by the provider of the front-end software. As another possible implementation, the disclosed software technology may be incorporated into a software application that takes the form of front-end client software running on one or more computing devices without interaction with a back-end computing platform. The software technology disclosed herein may be incorporated into a software application that takes other forms as well. Further, the front-end software may take various forms, examples of which may include a mobile application (e.g., a "full" version of the mobile application that includes all application functions and tools, a "lite" version of the mobile application that is less robust than the full version, etc.), a web application, and/or a hybrid application, among other possibilities.

The disclosed hardware and software technology will be described in further detail below.

The disclosed wearable device may comprise various components. Turning to FIG. 1, a simplified block diagram is provided to illustrate some structural components that may be included in an example wearable device 100 that may be configured to carry out any of the various functions disclosed herein, including but not limited to the functionality for capturing data and facilitating documentation of on-site observations as disclosed herein.

As shown in FIG. 1, the wearable device 100 may include one or more processors 102, data storage 104, one or more communication interfaces 106, one or more input interfaces 108, one or more output interfaces 110, and a sensor system 112, all of which may be communicatively linked by a communication link 114 that may take the form of a system bus or some other connection mechanism. Each of these components may take various forms.

For instance, the one or more processors 102 of the wearable device 100 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

The data storage 104 of the wearable device 100 may comprise one or more non-transitory computer-readable storage mediums that are collectively configured to store (i) program instructions that are executable by the processor(s) 102 such that the wearable device 100 is configured to perform any of the wearable device functionality disclosed herein, (ii) data that may be received, derived, or otherwise stored by (or for which storage is facilitated by), the wearable device 100, and (iii) software technology for facilitating communication with one or more other computing devices (e.g., an end-user device, a back-end computing platform, etc.) in order to carry out the functionality disclosed herein, which may take the form of front-end software in line with the discussion above. Depending on the implementation, the software technology for carrying out the disclosed functionality herein may be included wholly or partly on the wearable device, or may be distributed among the wearable device and one or more computing devices such as one or more end-user devices and/or a back-end computing platform. Additionally, the data storage 104 may comprise a voice recognition system that is configured to process voice inputs that may be detected via the input interface(s) 108.

The one or more non-transitory computer-readable storage mediums of the data storage 104 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. The data storage 104 may take other forms and/or store data in other manners as well.

The one or more communication interfaces 106 of the wearable device 100 may be configured to facilitate wireless and/or wired communication with other computing devices, such as one or more end-user devices or one or more back-end computing platforms in order to carry out the functionality disclosed herein. The communication interface(s) 106 may take any of various forms suitable to facilitate any of various types of wireless communication between the wearable device 100 and another computing device. For instance, as one example, the communication interface(s) 106 may comprise a Wi-Fi interface for connecting to and communicating over one or more Wi-Fi networks. As another example, the communication interface(s) 106 may comprise a Bluetooth interface for connecting to and communicating over one or more Bluetooth networks. As yet another example, the communication interface(s) 106 may comprise one or more wide area network (WAN) interfaces for connecting to and communicating to one or more WANs such as the Internet and/or a cellular network. The communication interface(s) 106 may be configured to facilitate communications in accordance with other short-range wireless protocols as well. In some implementations, the communication interface(s) 106 may facilitate wired communication between the wearable device 100 and another computing device. For instance, as one example, the communication interface(s) 106 may comprise a port (e.g., a USB port, etc.) for facilitating a wired connection to another computing device (e.g., for wired data transfer, etc.). Other configurations are also possible.

The one or more input interfaces 108 may be configured to receive user input from a user of the wearable device 100 and may take various forms. For instance, as one example, the input interface(s) 108 may comprise one or more microphone components for detecting audio, including voice inputs provided by the user. As another example, the input interface(s) 108 may comprise one or more physical control buttons that may be used by the user to provide inputs via pushing and/or pressing the control button(s). As yet another example, the input interface(s) 108 may comprise a capacitive interface for receiving touch-sensitive inputs. Other examples are also possible.

The one or more output interfaces 110 may be used to produce output for a user of the wearable device 100. The output interface(s) 110 may take any of various forms, and may include one or more visual and/or audio output devices. For instance, the output interface(s) 110 may include one or more visual output devices such as a status light (e.g., an LED light) or a display. Additionally or alternatively, the output interface(s) 110 may include one or more speakers for outputting audio such as notifications, chimes, or alerts, among other possibilities.

The sensor system 112 may include one or more image capture devices that function to capture image data, such as one or more cameras for capturing images and/or videos. The sensor system 112 may also include other types of sensors for capturing other types of data as well, such as temperature data (e.g., using a thermometer), distance data (e.g., using a laser-based rangefinder, a LiDAR sensor, etc.), and/or location and orientation data (e.g., using GPS, a gyroscope, etc.), among other possibilities. Notably, image capture devices of the wearable device 100 may be positioned such that they will face the same direction as a user wearing the wearable device 100, thus enabling real-time data capture that corresponds to visual observations made by the user.

Although not shown in FIG. 1, the wearable device 100 may also include a battery component and/or a charging port to receive power from an external battery source, among other possibilities.

It should be understood that FIG. 1 depicts structural components of a wearable device according to one example as described herein. Numerous other arrangements are possible and contemplated herein. For instance, in other embodiments, the wearable device 100 may include additional components not depicted and/or more or fewer of the depicted components, or may include a different arrangement of the components described above. For example, in one embodiment, one or more components of the input or output interfaces may be included in the sensor system or vice versa. Other examples are also possible.

The disclosed wearable device may take various forms. In some embodiments, the wearable device may advantageously be incorporated into the design of safety gear that a construction professional would typically already be wearing when conducting an inspection on a construction site, thereby reducing the need for donning additional gear while also complying with on-site safety standards. For instance, the wearable device may take the form of safety glasses or a hard hat. In some implementations, the wearable device may comprise more than one piece of equipment (e.g., safety glasses and a hard hat) that comprise various hardware and software components discussed above that collectively perform the wearable device functionality disclosed herein. Other examples are also possible.

Figure 2:
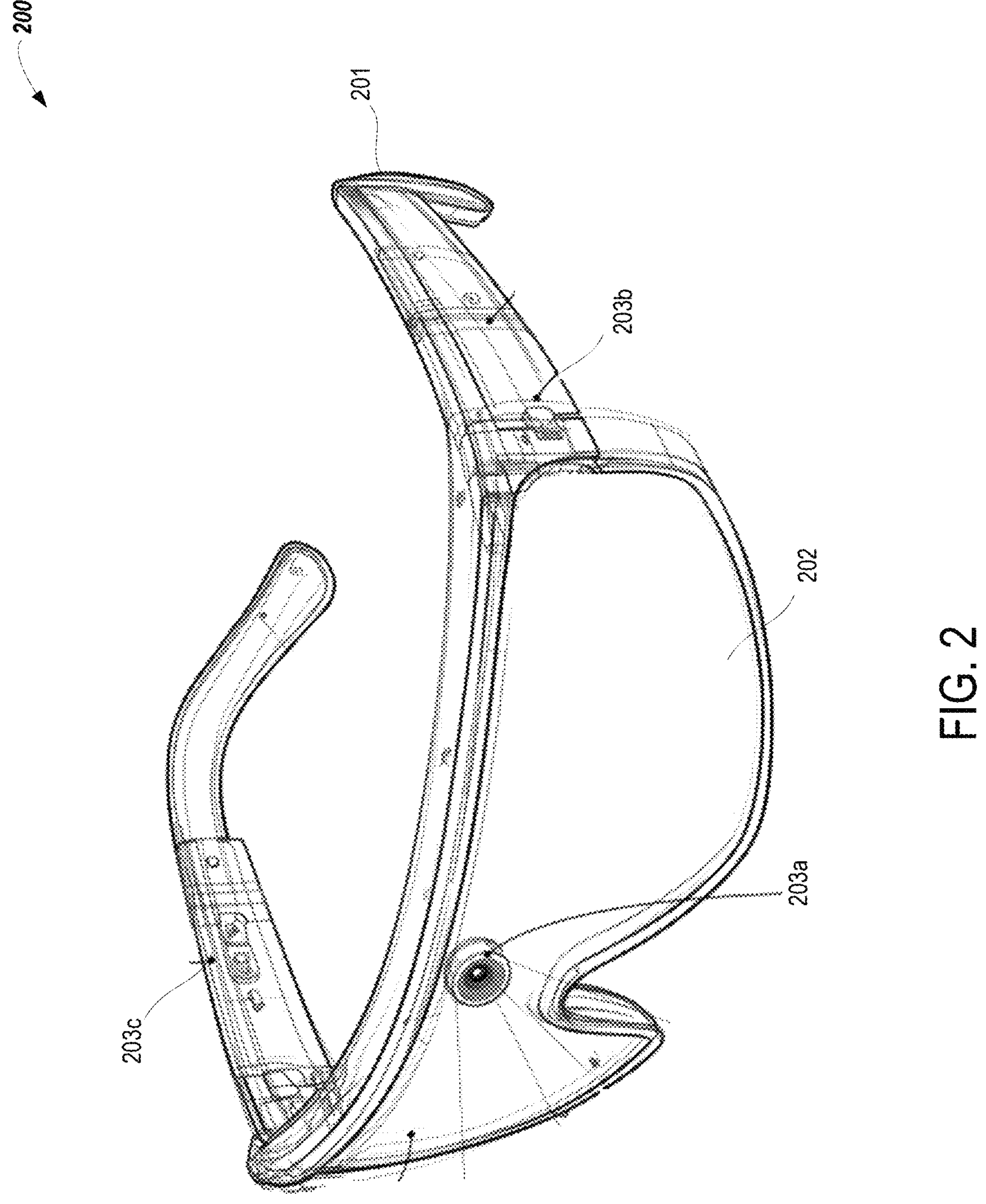
FIG. 2 depicts an example wearable device for facilitating data capture and documentation of on-site observations in accordance with one embodiment of the disclosed software technology.

One example of a disclosed wearable device that takes the form of safety googles is depicted in FIG. 2. As shown in FIG. 2, the wearable device 200 may comprise a frame portion 201 and a lens portion 202. The wearable device 200 may include one or more of the structural computing components 102-112 discussed above with reference to FIG. 1. For instance, the wearable device 200 may include one or more processors, data storage, and one or more communication interfaces (not shown in FIG. 2) housed within the frame portion 201. Further, the wearable device 200 may include a camera 203*a* that is configured to capture image data, a microphone 203*b* that is configured to capture audio data including user voice input, and a speaker 203*c* that is configured to output audio. The camera 203*a* and the microphone 203*b* may collectively form a sensor system of the wearable device 200, which may additionally comprise one or more input/output interfaces, one or more additional sensors, and/or one or more other data capture components in line with the discussion above that are not shown in FIG. 2. For instance, the wearable device 200 may also include one or more control buttons that may function to power the wearable device 200 on or off, cause the wearable device 200 to operate in a given operating mode, or cause the wearable device 200 to perform an action, among other possibilities.

In line with the discussion above, the wearable device 200 may be used by a construction professional to capture data at a construction site. For instance, the construction professional may wear the wearable device 200 while walking around on the construction site, and the wearable device 200 may capture, via the sensor system, various data to memorialize observations made by the construction professional. The data captured by the wearable device 200 may take any of various forms. For instance, as one example, the wearable device 200 may capture, via one or more cameras, image data such as still photos and/or videos. As another example, the wearable device 200 may capture, via one or more sensors, sensor data such as measurements (e.g., distance measurements) and temperature readings, among other possibilities. As yet another example, the wearable device 200 may capture, via one or more microphones, audio data, including voice data indicating a request spoken by a user wearing the wearable device 200 (e.g., requests such as "capture an image," "record a video," "estimate a measurement," etc.). Depending on the implementation, the data captured by the wearable device 200 may be stored in a memory of the wearable device 200, transmitted to a different computing device for storage, or a combination thereof.

It should be understood that in different embodiments, the wearable device 200 may comprise a different number of components (e.g., cameras, sensors, etc.) than shown in FIG. 2, and one or more of the components may be positioned differently than as shown. For instance, in the example of FIG. 2, the camera 203*a* is positioned in a relatively central location of the wearable device 200 (e.g., central relative to the frame portion 201), which may facilitate capture of image data corresponding to objects that are anterior to (i.e., in front of) a user that is wearing the wearable device 200. However, depending on the implementation, the camera 203*a* may be positioned differently, and/or the wearable device 200 may comprise one or more additional cameras to facilitate capture of image data from other angles. Advantageously, this may enable capture of image data from any angle relative to the user wearing the wearable device 200.

For instance, as one possibility, in one implementation, the camera 203*a* may be positioned on a first side of the wearable device (e.g., a first side of the frame portion 201), and a second camera may be positioned on a second side of the wearable device 200 (e.g., a second side of the frame portion 201), thereby enabling capture of image data corresponding to objects located laterally to the user wearing the wearable device 200. As another possibility, in another implementation, the wearable device 200 may comprise two additional cameras that are positioned on either side of the wearable device 200 in addition to the camera 203*a*, thereby enabling capture of image data corresponding to objects located anterior to and lateral to the user wearing the wearable device 200. As yet another possibility, in another implementations, the wearable device 200 may comprise one or more additional cameras positioned along a top side or a back side of the wearable device 200, thereby enabling capture of image data within a full angle (e.g., a 360-degree rotation) of the user wearing the wearable device 200. For instance, the wearable device 200 may comprise one or more support components to hold the frame portion 201 in place along the user's head (e.g., one or more adjustable straps that wrap above the head and/or behind the head), and the one or more additional cameras may be positioned along the support components to capture image data corresponding to objects located behind or above the user. Many other examples are possible.

As mentioned above, data that is captured by the wearable device 200 may be used to generate prompts for one or more generative artificial intelligence (AI) models to facilitate actions including documentation of on-site observations made by a construction professional, creation of new data objects within a construction management software application, and completion of tasks related to the on-site observations and/or the new data objects.

Figure 3:
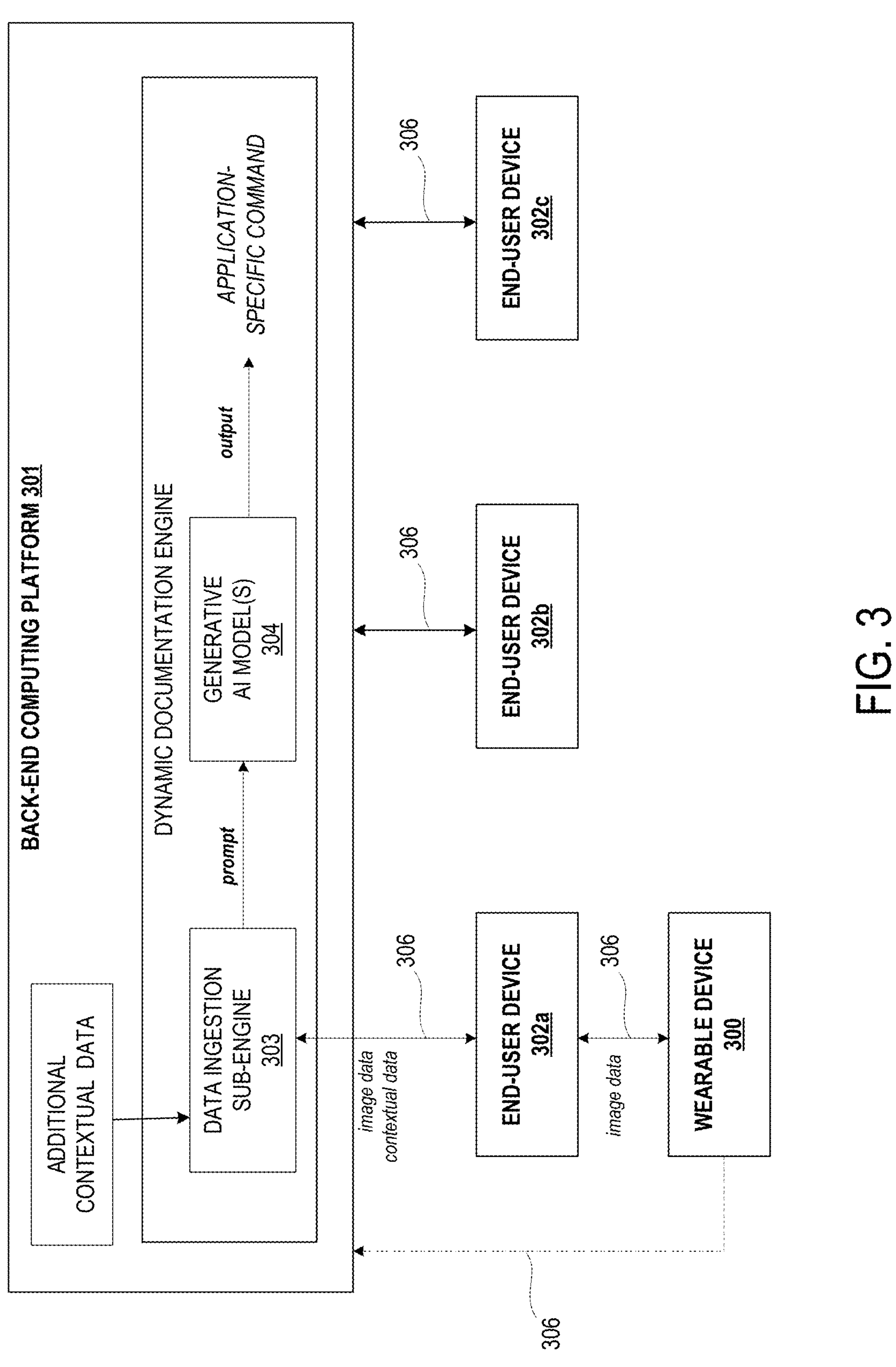
FIG. 3 depicts an example computing environment in which example embodiments of the disclosed software technology may be implemented.

Turning now to FIG. 3, an example computing environment in which example embodiments of the present disclosure may be implemented is shown. The computing environment may include a back-end computing platform 301 that may be communicatively coupled to one or more computing devices, such as one or more end-user devices 302, depicted here, for the sake of discussion, as end-user devices 302*a*, 302*b*, and 302*c*.

The back-end computing platform 301 may comprise any one or more computer systems (e.g., one or more servers) that have been installed with software for carrying out the back-end computing platform functionality disclosed herein. In practice, the one or more computer systems of the back-end computing platform 301 may generally comprise some set of physical computing resources (e.g., processors, data storage, communication interfaces, etc.), which may take any of various forms.

As one possibility, the back-end computing platform 301 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the back-end computing platform 301 may comprise "on-premises" computing resources of the organization that operates the back-end computing platform 301 (e.g., organization-owned servers). As yet another possibility, the back-end computing platform 301 may comprise a combination of cloud computing resources and on-premises computing resources.

Further, in practice, software on the back-end computing platform 301 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

In the example of FIG. 3, the back-end computing platform 301 may comprise a software engine, referred to herein as a "dynamic documentation engine," that includes certain software components that are configured to carry out the functionality disclosed herein. For instance, the dynamic documentation engine may comprise a data ingestion sub-engine 303 that functions to receive input comprising data captured by a wearable device, contextual data determined by an end-user device, and perhaps also additional contextual data determined by the back-end computing platform 301, and in turn generate a prompt for one or more generative AI models 304. The generative AI model(s) 304 may take any of various forms, such as one or more large language models (LLMs), one or more neural networks (e.g., recurrent neural networks), or one or more generative adversarial networks (GANs), among other possibilities. The prompt may generally take the form of text that requests the generative AI model(s) to perform a task, although the prompt make take other forms as well. For instance, the prompt may comprise image data accompanied by natural language text indicating a request related to the object(s) depicted in the image data, based on which the generative AI model(s) 304 may output an application-specific command to facilitate the request.

As shown in FIG. 3, each end-user device 302 may be configured to communicate with the back-end computing platform 301 over a respective communication path 306. Each respective communication path 306 may generally comprise one or more data networks and/or data links, which may take any of various forms. For instance, each respective communication path 306 may include any one or more of a personal area network (PAN), a local area network (LAN), a wide area network (WAN) such as the Internet and/or a cellular network, a cloud network, and/or a point-to-point data link, among other possibilities, where each such data network and/or link may be wireless, wired, or some combination thereof, and may carry data according to any of various different communication protocols. Additionally, some aspects of the communication between an end-user device 302 and the back-end computing platform 301 may be carried out via an Application Programming Interface (API) provided by the back-end computing platform 301, among other possibilities. Although not shown, the respective communication paths 306 may also include one or more intermediate systems, examples of which may include a data aggregation system and host server, among other possibilities. Many other configurations are also possible.

Each of the end-user devices 302 may be any end-user device that is capable of carrying out the end-user device functionality disclosed herein. In this respect, each end-user device 302 may include hardware components such as one or more processors, data storage, one or more communication interfaces, and one or more input/output interfaces, among other possible hardware components, as well as software components that facilitate the end-user device's ability to run front-end software incorporating the software technology disclosed herein, which may take the form of a construction management software application in line with the discussion above. Each end-user device 302 may take any of various forms, examples of which may include a smartphone, a tablet, a desktop computer, a laptop computer, a netbook, and/or a personal digital assistant (PDA), among other possibilities.

While FIG. 3 shows an arrangement in which three particular end-user devices 302 are communicatively coupled to the back-end computing platform 301, it should be understood that this is merely for purposes of illustration and that any number of end-user devices 302 may communicate with the back-end computing platform 301.

Although not shown in FIG. 3, the back-end computing platform 301 may also be configured to receive data, such as data related to a construction project, from one or more external data sources, such as an external database and/or another back-end computing platform or platforms. Such data sources—and the data output by such data sources—may take various forms.

The example computing environment of FIG. 3 may also include a wearable device 300 that is configured to communicate with one or both of a given end-user device 302 and the back-end computing platform 301. For instance, in one implementation, the wearable device 300 may be configured to communicate indirectly with the back-end computing platform 301 via the end-user device 302*a* over a respective communication path 306. In such an implementation, the wearable device 300 may be provisioned with a lite version of a construction management software application as described above, in which case the wearable device 300 may transmit data captured by the wearable device 300

(e.g., image data, voice data, etc.) to the end-user device 302*a* for further processing. In turn, the end user device 302*a* may transmit to the back-end computing platform 301 (i) the data captured by the wearable device 300, which may or may not be processed in some way by the end-user device 302*a*, and (ii) contextual data determined by the end-user device 302*a*, which may form at least part of an input that is provided to the data ingestion sub-engine 303 for generating an AI prompt.

In another implementation, the wearable device 300 may be configured to communicate directly with the back-end computing platform 301 over a respective communication path 306. In such an implementation, the wearable device 300 may be provisioned with a more robust version of the construction management software application as described above, in which case the wearable device 300 may transmit data captured by the wearable device 300 (e.g., image data, voice data, etc.) directly to the back-end computing platform 301 for further processing. Further, in such an implementation, communications between the wearable device 300 and the back-end computing platform 301 may be reflected at one or more end-user devices (e.g., via respective user interfaces). For instance, the back-end computing platform 301 may cause one or more of the end-user devices 302 to display a representation of data received from the wearable device 300 (e.g., images, videos, etc.) and/or a representation of data generated by the back-end computing platform 301 based on data received from the wearable device 300 (e.g., new data objects, notifications for new tasks, etc.). Other configurations are possible as well.

It should be understood that the computing environment shown in FIG. 3 is one example of a computing environment in which the disclosed software technology may be implemented, and that numerous other examples of computing environments are possible as well—including but not limited to the possibility that the computing environment may include additional devices, systems, and/or platforms that could be involved in the disclosed functionality, among other examples.

Figure 4:
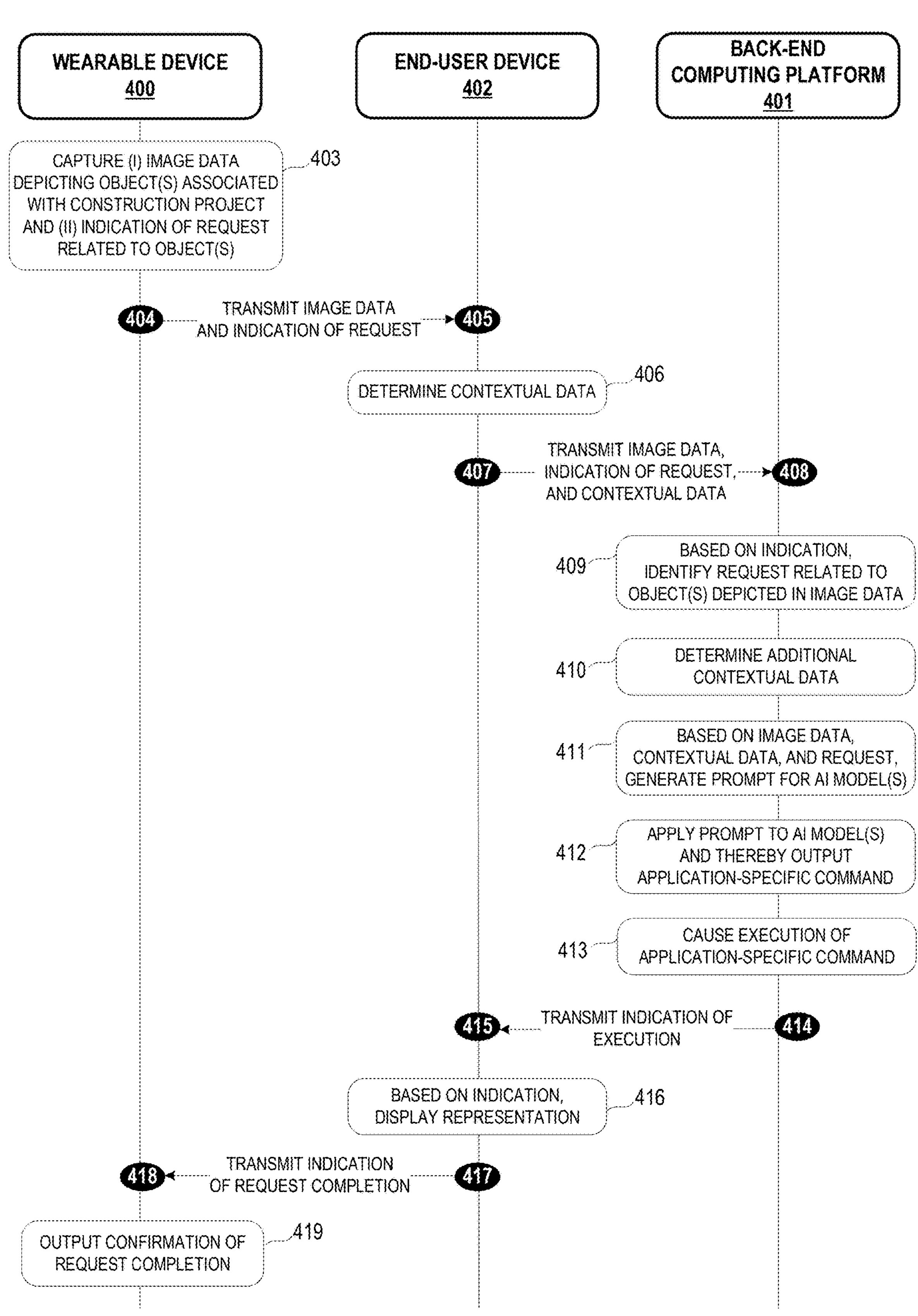
FIG. 4 depicts a workflow of example functionality that may be carried out by various computing devices for facilitating data capture, documentation of on-site observations, and creation of new data objects, in accordance with one embodiment of the disclosed technology.

Turning now to FIG. 4, an example workflow for carrying out the disclosed functionality according to one embodiment is depicted. The example workflow may involve (i) a wearable device 400 (which may be any of the wearable devices 100, 200, or 300 described above) that is associated with a given user and configured to communicate with (ii) an end-user device 402 (which may be the end-user device 302*a* described above) that is also associated with the given user and configured to communicate with (iii) a back-end computing platform 401 (which may be the back-end computing platform 301 described above). In line with the discussion above, the wearable device 400 may be provisioned with front-end software incorporating the software technology disclosed herein, which may take the form of at least a lite version of a front-end construction management software application. Further, the end-user device 402 may be provisioned with front-end software incorporating the software technology disclosed herein, which may take the form of a more robust version or full version of the front-end construction management software application. Similarly, and the back-end computing platform 401 may be provisioned with back-end software for the construction management software application that incorporates the software technology disclosed herein.

The example workflow may begin at 403, with the wearable device 400 capturing (i) image data depicting one or more objects associated with a construction project and (ii) an indication of a request related to the one or more objects depicted in the image data. In practice, as described above, the wearable device 400 may be worn by a construction professional physically present at a construction site associated with a given construction project. As the construction professional moves through the construction site and sees a potential issue that requires documentation, the construction professional may provide user input indicating a request for the wearable device 400 to initiate some action based on what the construction professional is seeing. For instance, the construction professional may observe a potential safety hazard or an object that requires follow-up and may provide user input, which may be detected by the wearable device 400, that indicates a request to capture image data that includes the observed potential safety hazard or the object.

The user input that may be detected by the wearable device 400 may take various forms. As one possibility, the user input may take the form of voice input spoken by the construction professional that indicates a request related to one or more objects that the construction professional is viewing in real-time (e.g., "take a picture of the broken switch plate," "create a punch item for the broken switch plate,"). In some implementations, the voice recognition system may be configured to process audio data received via one or more microphones of the wearable device 400 to listen for a wake word, such as "Hey Procore," which may then be followed by such a request.

The wearable device 400 may be configured to process such a request in various ways, which may depend on whether or not certain keywords are indicated in the voice input. For instance, in one implementation, the wearable device 400 may be configured to locally process voice data that indicates only certain types of requests, such as requests involving one or more hardware components of the wearable device 400 (e.g., capturing image data via an image capture component of the wearable device 400, capturing sensor data via a sensor of the wearable device 400, etc.) based on identifying certain keywords indicating functionality related to the one or more hardware components (e.g., "capture," "take a picture," "record a video," etc.). In such an implementation, the wearable device 400 may be configured to transmit voice data indicating other requests involving non-localized functions to another computing device for processing (e.g., based on determining that the certain keywords indicating functionality related to the one or more hardware components are not present in the voice data), which advantageously enables the wearable device 400 to be provisioned with a lightweight version of a voice recognition system that requires less compute resources.

In another implementation where the wearable device 400 is configured to locally process voice data that indicates only certain types of requests and where the wearable device 400 determines that the voice input does not contain any of the certain keywords indicating functionality related to the one or more hardware components, the wearable device 400 may be configured to capture image data based on an inference that the voice input indicates a request related to one or more objects currently being observed by the construction professional, where the captured image data depicts the one or more objects. In yet another implementation, the wearable device 400 may be configured to locally process any voice data detected by the wearable device 400, in which case the wearable device 400 may be provisioned with a more robust voice recognition system. Other examples are also possible.

As another possibility, the user input that may be detected by the wearable device 400 may take the form of (i) user input indicating an instruction to capture image data that is provided via one or more control buttons of the wearable device 400, such as by pressing and/or holding a (e.g., short press, long press, successive presses within a given amount of time, etc.) control button along with (ii) a request related to one or more objects depicted in the image data, which may be provided via voice input following the user input indicating the instruction to capture the image data. In this respect, each of different types of inputs may indicate a different command for the wearable device 400 to perform (e.g., short press to capture an image, long press to record a video, successive presses within a given amount of time to perform other tasks, etc.). The user input may take other forms as well.

The wearable device 400 may capture the image data and the indication of the request related to one or more objects depicted in the image data in other ways as well.

In any event, after capturing the image data and the indication of the request, at 404, the wearable device 400 may transmit a data communication to the end-user device 402 indicating the image data and the indication of the request. In some implementations, the wearable device 400 may transmit a recording of the voice data detected by the wearable device 400. In other implementations, the wearable device 400 might utilize a speech recognition technique to convert the input voice data to text and then transmit the speech-to-text output to the end-user device 402, either by itself or with a copy of the voice data. At 405, the end-user device 402 may receive the data communication.

In turn, at 406, the end-user device 402 may determine contextual data related to the request based on one or both of the image data or the request. The contextual data that is determined by the end-user device 402 may take various forms. As one possibility, the contextual data may comprise data related to a given user account, such as a user account associated with the construction management software application provisioned on the end-user device 402. In practice, the end-user device 402 is likely to be associated with the construction professional wearing the wearable device 400, and the construction professional may log in to the construction management software application installed on the end-user device 402 using the given user account. Thus, the end-user device 402 may obtain information related to the given user account, such as the construction professional's name, trade, role, or user permissions, among other possibilities. As another possibility, the contextual data may comprise location data associated with the construction site that is obtained, for example, via one or more location sensors of the end-user device 402 (e.g., GPS data, IMU data, etc.), network connectivity information associated with the end-user device 402 (e.g., connection to a given data network provided at the construction site), or triangulation data (e.g., Bluetooth triangulation), among other possibilities. The contextual data may take other forms as well.

Further, although not shown in FIG. 4, the end-user device 402 may process the voice data received from the wearable device 400. For instance, as one possibility, the end-user device 402 may apply one or more speech recognition techniques to generate a text transcription of the voice input detected by the wearable device 400. The end-user device 402 may process the voice data in other ways as well.

At 407, the end-user device 402 may transmit, to the back-end computing platform 401, a data communication comprising (i) the image data, (ii) data (e.g., the voice data, a text-based transcription of the voice data, etc.) indicating the request related to the object(s) depicted in the image data, and (iii) the contextual data determined by the end-user device 402.

At 408, the back-end computing platform 401 may receive the data communication including the image data, the data indicating the request, and the contextual data. In one implementation, the data communication may be received by a particular software component of the back-end computing platform 401. For instance, returning briefly to FIG. 3, the data communication may be received by the dynamic documentation engine of the back-end computing platform 401, and the image data, the data indicating the request related to the object(s) depicted in the image data, and the contextual data may be provided collectively as input to the data ingestion sub-engine 303.

In turn, at 409, based on the data indicating the request related to the object(s) depicted in the image data, the back-end computing platform 401 may identify the request related to the object(s). For instance, as mentioned above, the data indicating the request may comprise voice data or a text-based transcription of the voice data, and the back-end computing platform 401 may parse that data in order to determine an identified request that may be carried out by one or more particular software tools of the construction management software application. For example, the text-based transcription of the voice data may read "Hey Procore, create a new punch item for this hole in the wall," which indicates a request for a punch item software tool of the construction management software application to create a new punch item to repair a hole in a wall observed by the construction professional on-site, and the back-end computing platform 401 may parse the text-based transcription to identify the request. In this respect, the data ingestion sub-engine 303 may apply pre-processing logic to data indicating the request in order to identify the request. The pre-processing logic may take various forms. For instance, as one possibility, the pre-processing logic may take the form of natural language processing (NLP) that is applied to the text data indicating the request related to the object(s) depicted in the image data in order to identify the request related to the object(s) depicted in the image data. Other examples are also possible.

At 410, the back-end computing platform 401 may determine additional contextual data that may be provided to the data ingestion sub-engine 303. In some implementations, this may involve processing the image data to identify the one or more objects depicted in the image data in order that can then be used to aid the determination of the contextual data. In this respect, the back-end computing platform 401 may apply one or more image processing and/or object recognition techniques in order to identify given objects in the image data, based on which at least some of the additional contextual data may be determined. However, in other implementations, the image processing and/or object recognition techniques may instead be performed by the AI model(s) after receiving the prompt from data ingestion sub-engine 303 in order to identify on or more given objects depicted in the image data based on the content of the request.

The additional contextual data may take any of various forms. For instance, as some nonlimiting examples, the additional contextual data may comprise phase information for the given construction project, information about equipment installation, information about progress for one or more tasks associated with the given construction project, information about one or more project schedules associated with the given construction project (e.g., in implementations where the image processing and/or object recognition is performed by the back-end computing platform 401 prior to generating the prompt for the AI model(s)), object-specific information about one or more objects depicted in the image data, or site-specific location information indicating a particular location within the construction site where the one or more objects depicted in the image data are located (e.g., based on location data provided by the end-user device), among various other possibilities. The additional contextual data may supplement the contextual data received from the end-user device 402 as part of the input that is provided to the data ingestion sub-engine 303.

At 411, based on (i) the image data, (ii) the request related to the object(s) depicted in the image data, and (iii) the contextual data, the back-end computing platform 401 (e.g., the data ingestion sub-engine 303) may generate a prompt that is to be provided as input to one or more generative AI models of the back-end computing platform 401, which may be the generative AI model(s) 304 depicted in FIG. 3 and discussed above. In line with the discussion above, the prompt may instruct the AI model(s) to generate a desired response (e.g., cause the request related to the object(s) depicted in the image data to be carried out).

At 412, the prompt may be provided as input to the generative AI model(s) 304, based on which the generative AI model(s) 304 may output an application-specific command that is to be carried out within the construction management software application. As mentioned above, in some implementations, this may involve the generative AI model(s) 304 applying one or more image processing and/or object recognition techniques in order to identify given objects in the image data that are implicated in the application-specific command.

The application-specific command may take various forms. In general, the application-specific command may be responsive to the request related to the object(s) depicted in the image data. For instance, as one possibility, if the request comprises a request to create a new data object of a given type, the application-specific command may comprise a command for a given software tool provided by the construction management software application that facilitates creation of new data objects of the given type to create the new data object. In this respect, each of various software tools provided by the construction management software application may facilitate creation of a respective type of data object and may dictate respective data requirements for creating a new data object of the respective type, such as (i) information about the new data object (e.g., title, description, manager, assignee, etc.), (ii) reference information that should be associated with the new data object (e.g., images, videos, etc.), (iii) date information for the new data object (e.g., create date, due date, etc.), (iv) scheduling information related to the new data object (e.g., expected completion date for a task related to the new data object, scheduling delays related to the new data object, etc.), (v) information about a trade related to the new data object (e.g., electrical, plumbing, etc.), (vi) information indicating a priority for the new data object and/or a related task (e.g., low, medium, high, etc.), or (vii) location information related to the new data object (e.g., on-site location for a task related to the new data object, etc.), among various other possibilities.

As another possibility, if the request comprises a request to associate captured image data with an existing data object of a given type, the application-specific command may comprise a command for a given software tool that facilitates managing data objects of the given type to identify the existing data object, update data defining the existing data object to include information about the image data, and/or store the image data in association with the existing data object.

As yet another possibility, if the request comprises a request to share data (e.g., data being captured by the wearable device 400) in real-time with one or more given user accounts, the application-specific command may comprise a command for a given software tool to take one or more actions for facilitating data live-sharing, which may involve actions including (i) generating a new live-share session, (ii) accessing a live feed of image data being captured by the sensor system of the wearable device 400, and (iii) generating notifications regarding the live-share for provision to each given user account, among other possibilities.

Further yet, as another possibility, if the request comprises a request to report a safety hazard, the application-specific command may comprise a command for a given software tool to take one or more actions including creating a new data object memorializing the safety hazard and causing one or more computing devices, such as devices associated with an alarm system at the construction site, to output an alert regarding the safety hazard.

Further still, another possibility, if the request comprises a request for information about one or more objects depicted in the image data (e.g., information about measurements of a given object, information about installation status of a given object, etc.), the application-specific command may comprise a command for a given software tool to obtain the requested information, which may then be transmitted to the end-user device 402, for example, to cause the end-user device 402 to display a visual representation of the requested information, and/or to cause the wearable device 400 to output an audio representation of the requested information, among other possibilities.

Persons of ordinary skill in the art will appreciate that in line with the discussion above, various other examples of application-specific commands are contemplated by the software technology disclosed herein.

At 413, the back-end computing platform 401 may cause the application-specific command to be executed. For instance, the back-end computing platform 401 may provide the command to one or more given software tools in line with the discussion above and thereby cause the given software tool(s) to take one or more actions responsive to the request related to the object(s) depicted in the image data. Thereafter, the back-end computing platform 401 may determine whether or not the command has been executed. For instance, as one possibility, the back-end computing platform 401 may monitor data associated with the construction management software application to determine if a new data object based on the request related to the object(s) depicted in the image data has been created, and if the new data object has been created, the back-end computing platform 401 may determine that the command has been executed. As another possibility, the back-end computing platform 401 may receive an indication from the given software tool(s) that the command has been executed, based on which the back-end computing platform 401 may determine that the command has been executed. The back-end computing platform 401 may determine that the command has been executed in other ways as well. In some implementations, if the back-end computing platform 401 determines that the command has not been executed within a given period of time, the back-end computing platform 401 may take further action to cause the command to be executed, such as re-transmitting the command to the given software tool(s), among other possibilities.

At 414, the back-end computing platform 401 may transmit to the end-user device 402 a data communication comprising a response indicating that request related to the object(s) depicted in the image data has been fulfilled, perhaps along with information about execution of the application-specific command, such as information about any new data objects that were created in response to the request.

At 415, the end-user device 402 may receive the data communication comprising the response. In turn, at 416, the end-user device 402 may display, via a user interface, a visual indication of the response, which may include a graphical representation of a new data object that was created in response to the request.

In line with the discussion above, the back-end computing platform 401 may generate a respective data communication indicating the response and/or information about the new data object that was created in response to the request for transmission to each of one or more other end-user devices. For instance, if data defining the new data object indicates a second construction professional (e.g., a party designated as an assignee, a party responsible for completing a task, etc.), the back-end computing platform 401 generate a notification regarding the new data object for transmission to a respective end-user device associated with the second construction professional, and the respective end-user device may display, via its respective user interface, information including a graphical representation of the new data object.

At 417, the end-user device 402 may transmit a data communication to the wearable device 400 indicating that the request related to the object(s) depicted in the image data has been fulfilled. At 418, the wearable device 400 may receive the data communication. In turn, at 419, the end-user device 402 may produce an output indicating that the request related to the object(s) depicted in the image data has been fulfilled. The output may comprise a visual output or an audio output produced by the output component(s) of the wearable device and may take various forms, such as a spoken output confirming that the request related to the object(s) depicted in the image data has been fulfilled, an alert (e.g., a status light illuminating, a chime, etc.) indicating that the request related to the object(s) depicted in the image data has been fulfilled, or a combination of both, among other possibilities.

It should be understood that although steps 403-419 depicted in the example workflow of FIG. 4 are illustrated in sequential order, some of these steps may also be performed in parallel, and/or in a different order than those described herein. Also, the various steps may be combined into fewer steps, divided into additional steps, and/or removed based upon the desired implementation. Furthermore, while the steps 403-419 may be described as being performed by a certain computing device depicted in FIG. 4, it is possible that depending on the implementation, any one or more of the steps 403-419 may be performed by a different computing device depicted in FIG. 4, or may be split differently amongst one or more of the computing devices shown in FIG. 4. For instance, in some implementations, one or both of the wearable device 400 or the end-user device 402 may be configured to carry out all of the steps 403-419 in-whole.

In addition, for the example workflow depicted in FIG. 4, the workflow shows functionality according to one possible implementation of embodiments described herein. In this regard, each step may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, each step shown in FIG. 4 may represent circuitry that is wired to perform the specific logical functions in the process.

Figure 5:
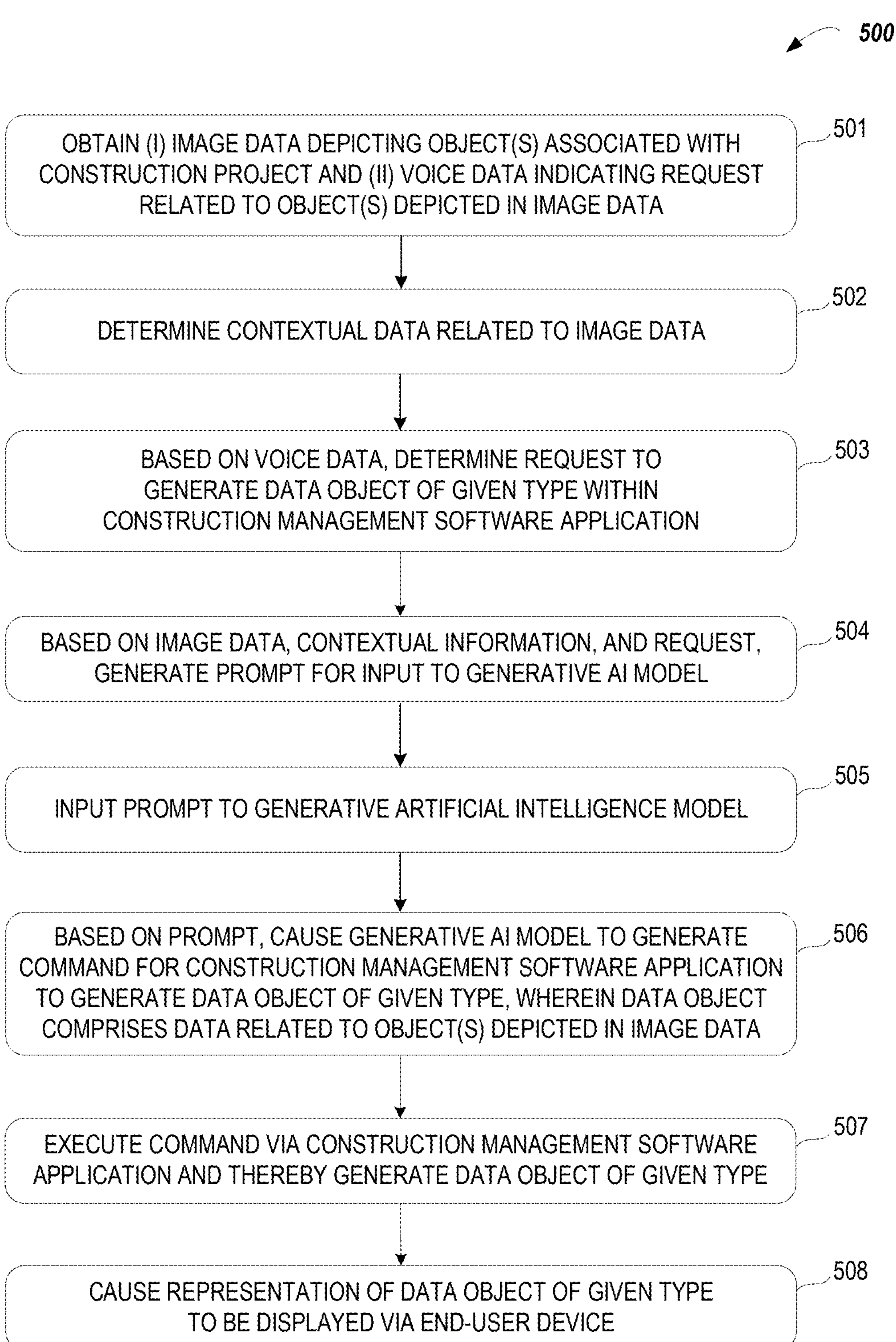
FIG. 5 depicts a flow diagram of example functionality that may be carried out by a computing system for facilitating data capture, documentation of on-site observations, and creation of new data objects, in accordance with one embodiment of the disclosed technology.

Turning now to FIG. 5, a flow diagram depicting example functionality 500 that may be carried out by a computing system according to one embodiment of the disclosed software technology is provided. The computing system may include, for example, (i) a wearable device (which may be any of the wearable devices 100, 200, 300, or 400 described above) that is associated with a given user and configured to communicate with (ii) an end-user device (which may any of be the end-user devices 302 or 402 described above) that is also associated with the given user and configured to communicate with (iii) a back-end computing platform (which may be any of the back-end computing platforms 301 or 401 described above).

The example functionality 500 may begin at block 501, where the computing system may obtain (i) image data depicting one or more objects associated with a construction project and (ii) voice data indicating a request related to the one or more objects depicted in the image data. In line with the discussion above, in one implementation, the image data and voice data may be captured by a wearable device that is worn by a construction professional present on a construction site of the construction project, and the wearable device may transmit the captured data to an end-user device associated with the construction professional.

At block 502, the computing system may determine contextual data related to the image data. In line with the discussion above, in one implementation, the contextual data may be determined by the end-user device associated with the construction professional that is configured to communicate with the wearable device. Further, the contextual data may take various forms, including user account data or location data, among other possibilities. As mentioned above, the end-user device may transmit (i) the image data, (ii) a speech-to-text transcription of the voice data, and (iii) the contextual data to a back-end computing platform.

At block 503, the computing system may identify, based on the speech-to-text transcription of the voice data, a request to generate a data object of a given type within a construction management software application. For instance, in line with the discussion above, the back-end computing platform (e.g., the data ingestion sub-engine 303) may perform pre-processing on the speech-to-text transcription of the voice data to identify the request related to the one or more objects depicted in the image data, which may comprise the request to generate the data object of the given type.

At block 504, based on the image data, the contextual data, and the request, the computing system may generate a prompt for input to a generative AI model. For instance, in line with the discussion above, the data ingestion sub-engine 303 may generate a prompt that instructs a generative AI model 304 to take one or more actions responsive to the request. For example, the prompt may instruct the generative AI model to cause creation of the new data object of the given type.

At 505, the computing system may provide the prompt as input to the generative AI model. For instance, in line with the discussion above, the data ingestion sub-engine 303 may provide the prompt to the generative AI model 304.

In turn, at 506, the computing system may cause the generative AI model to generate an application-specific command for the construction management software application to generate the new data object of the given type, wherein the data object comprises data related to the one or more objects depicted in the image data. At 507, the computing system may execute the application-specific command and thereby generate the new data object of the given type. For instance, in line with the discussion above, the generative AI model 304 may, based on the prompt, output the application-specific command for a given software tool of the construction management software application to generate the new data object of the given type, and the given software tool may then generate the new data object, which may involve generating and storing data defining the new data object, wherein the data defining the new data object includes data about an object depicted in the image data.

At 508, the computing system may cause a representation of the new data object of the given type to be displayed at via an end-user device. For instance, in line with the discussion above, the back-end computing platform may transmit to the end-user device associated with the construction professional an indication that the request related to the one or more objects depicted in the image data has been fulfilled and the new data object of the given type has been generated. In turn, the end-user device may display a representation of the new data object. Furthermore, the end-user device may in turn transmit to the wearable device an indication that the request has been fulfilled, based on which the wearable device may output an audio notification indicating that the request has been fulfilled.

It should be understood that although the steps at blocks 501-508 depicted in the flow diagram of FIG. 5 are illustrated in sequential order, these steps may also be performed in parallel, and/or in a different order than those described herein. Also, the various steps may be combined into fewer steps, divided into additional steps, and/or removed based upon the desired implementation. Furthermore, while the steps at blocks 501-508 may be described below as being performed by a certain computing device of the computing system, it is possible that depending on the implementation, any one or more of the steps at blocks 501-508 may be performed by a different computing device, or may be split differently amongst one or more computing devices. For instance, depending on the implementation, the steps at blocks 501-508 may be carried out entirely by a wearable device or may be distributed amongst a wearable device, an end-user device, and/or a back-end computing platform.

Figure 6:
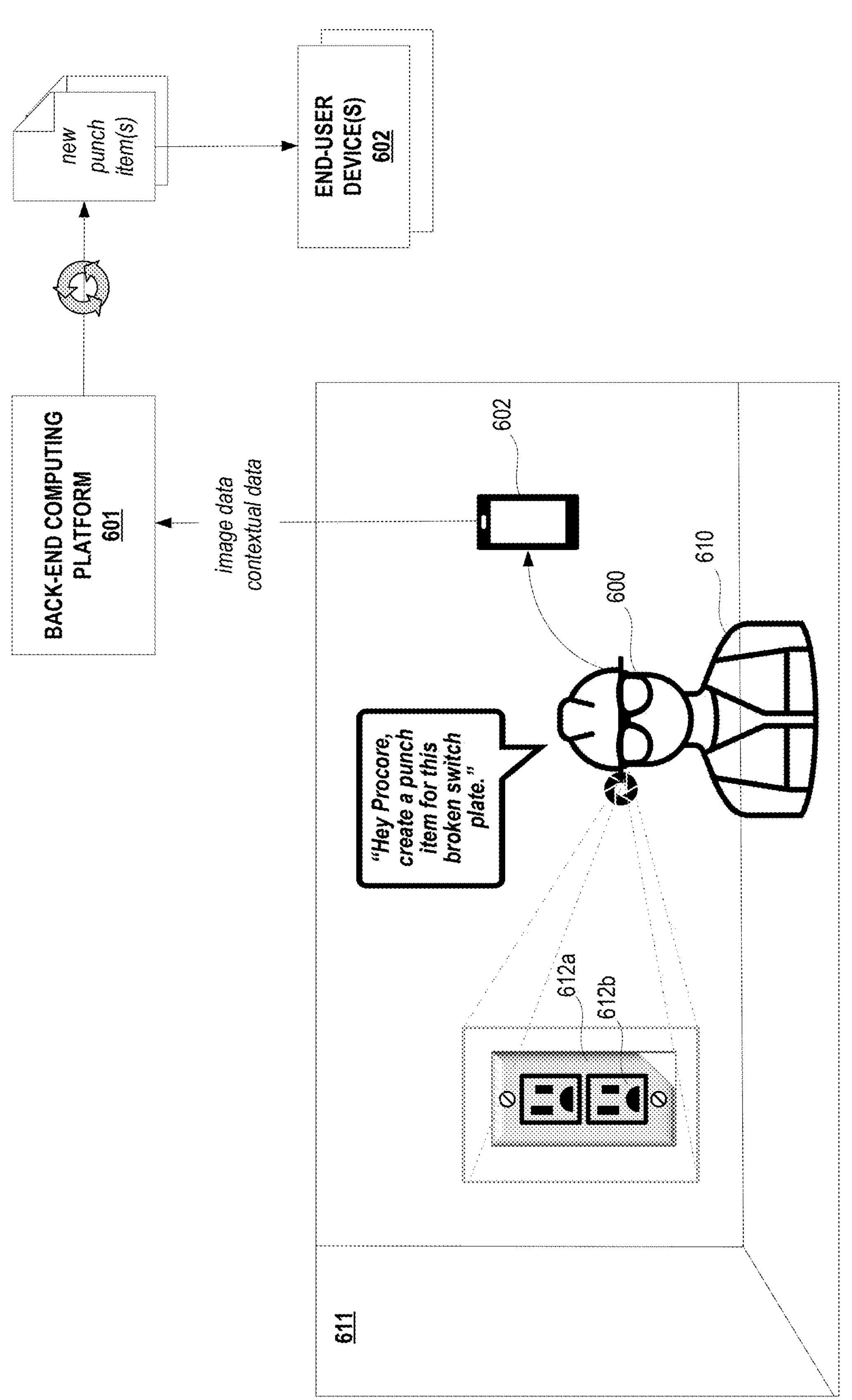
FIG. 6 depicts an illustrative example of a real-world environment in which embodiments of the disclosed software technology may be implemented.

Turning now to FIG. 6, a real-world example illustrating one possible scenario in which the disclosed hardware and software technology may be implemented is provided. The example of FIG. 6 depicts a construction professional 610 who is wearing a wearable device 600 that comprises a sensor system, is provisioned with front-end software for carrying out the disclosed functionality, and takes the form of construction safety glasses, as described above. The construction professional 610 may be present at a construction site, for example, to conduct a physical inspection and may have an associated end-user device 602 that is also provisioned with front-end software for carrying out the disclosed functionality. As the construction professional 610 walks around the construction site, the construction professional 610 may observe objects and/or events that require action. Advantageously, using the disclosed wearable device 600 may enable the construction professional 610 to conveniently capture data related to, and facilitate documentation of, the objects and/or events observed without needing to rely on the end-user device 602 or some other form of documentation (e.g., recording notes manually). Thus, in line with the discussion above, the construction professional 610 may simply speak a request for the wearable device to capture image data and facilitate creation of new data objects.

For instance, as shown in FIG. 6, while moving through the construction site, the construction professional 610 may enter a given room 611. While inspecting the room 611, the construction professional 610 may observe that a given switch plate 612*a* for a given outlet 612*b* in the room 611 is broken and requires repair. Thus, the construction professional 610 may speak a request, "Hey Procore, create a punch item for this broken switch plate." The wearable device 600 may (i) detect voice input indicating the request via a microphone component of the sensor system and (ii) capture, via a data capture component of the sensor system, image data depicting the switch plate 612*a*, which the wearable device 600 may transmit to the end-user device 602.

In turn, the end-user device 602 may generate a text transcription of the voice data, identify contextual data related to the image data, and transmit (i) the image data, (ii) text data indicating the request, and (iii) the contextual data to a back-end computing platform 601. In line with the discussion above, the contextual data may comprise data related to a user account associated with the construction professional 610 that is used to log in to a construction management software application installed on the end-user device 602, along with location data determined by the end-user device 602, among other possibilities.

Based on receiving the (i) the image data, (ii) the text data indicating the request, and (iii) the contextual data, the back-end computing platform 601 may apply pre-processing to the text data to identify the request indicated in the voice input and may also determine additional contextual data related to the image data. For instance, based on applying the pre-processing to the text data indicating the request, the back-end computing platform 601 may identify a request to create a new punch list item, for a punch list associated with the construction project, to fix the broken switch plate 612*a* in room 611 of a given facility at the construction site. Further, the additional contextual data may take various forms. For instance, based on applying one or more image recognition techniques, the back-end computing platform 601 may identify the switch plate 612*a*, the outlet 612*b*, and the room 611 of the construction site. Further, the back-end computing platform 601 may determine a given trade related to the switch plate 612*a* (e.g., electrical) and one or more given parties who might be responsible for completing electrical work for the construction project. Further yet, the back-end computing platform 601 may determine that the construction project is currently in a punch list phase where final inspections are being conducted in order to identify any final outstanding tasks that need attention, based on which the back-end computing platform 601 may identify information such as project scheduling information indicating how much time should be allocated for completing punch list items, and whether repairing the switch plate 612*a* is expected to cause delays to the project schedule (e.g., if the given parties who are responsible for completing electrical work for the construction project are currently working on a different task, etc.), among other possibilities. The back-end computing platform 601 may determine other types of contextual data as well.

Based on (i) the image data, (ii) the contextual data (including the additional contextual data), and (iii) the request to create the new punch list item to fix the broken switch plate 612*a*, the back-end computing platform 601 may generate a prompt that is to be provided as input to one or more generative AI model(s) of the back-end computing platform 601. In turn, based on the prompt, the generative AI model(s) may output an application-specific command for a punch list tool of the construction management software application to generate the new punch list item to fix the broken switch plate 612*a*, where the new punch list item is to include information related to the image data captured by the wearable device 600 and the contextual data determined by the end-user device 602 and/or the back-end computing platform 601. Based on the command, the punch list tool may then create the new punch list item by generating data defining the new punch list item, wherein the data defining the new punch list item includes the image data and the contextual data.

Furthermore, the back-end computing platform 601 may cause notifications regarding the new punch list item to be generated for transmission to the end-user device 602 associated with the construction professional 610 and/or one or more other end-user devices 602 associated with one or more other parties, such as another construction professional who is responsible for completing electrical work for the construction project. In turn, the one or more end-user devices 602 may display, via a user interface, a visual representation of the new punch list item.

FIG. 7 depicts one such example of a user interface view 700 that includes a visual representation 701 of the new punch list item, which may have been generated by the back-end computing platform 601 in line with the discussion above with reference to FIG. 6. In particular, the new punch list item depicted in FIG. 7 may have been generated within the punch list tool of the construction management software application, a software tool that was specifically selected by the back-end computing platform 601 (e.g., the generative AI model) based on the input noted above. The new punch list item may include information related to the image data, the contextual data, and the request to create the punch list item, at least some of which may be reflected in the visual representation of the new punch list item.

For instance, as shown in FIG. 7, an "Attachments" data field 710 has been populated with media content associated with the new punch list item that may be selectable for viewing. The media content may comprise, for example, the image data (e.g., still photos and/or video) of the switch plate 612*a* that was captured by the wearable device 600. Further, a "Title" data field 711 has been populated with a title for the new punch list item, which may have been determined based on the request to create the punch list item. Further yet, a "Manager" data field 712 and a "Final Approver" data field 713 have each been populated with respective information about a party that is responsible for managing and approving the punch list item, which may have been determined based on contextual data comprising data related to a user account associated with the construction professional 610. For instance, the contextual data may indicate that the construction professional 610 (i) is named "Avery Marksman" and (ii) is an inspector in charge for overseeing inspections for the construction project, based on which "Avery Marksman" has been identified as the manager and the final approver of the punch list item.

Furthermore, an "Assignee" data field 714 has been populated with information for one or more assignees for the punch list item, which may have been determined based on contextual data comprising trade data for the switch plate 612*a* depicted in the image data and data related to a party that is responsible for completing the punch list item. For instance, the contextual data may indicate that (i) the switch plate 612*a* is electrical equipment, (ii) an electrical subcontractor for the construction project is an electrical company "W&H Electrical," and (iii) an individual named "John Watson" is a supervisor for the electrical company "W&H Electrical," based on which "John Watson" and "W&H Electrical" have each been identified as an assignee of the punch list item.

Further still, a "Location" data field 715 has been populated with specific information about a location (e.g., floor, room) within the construction project where the switch plate 612*a* that requires fixing is located, which may have been determined based on contextual data comprising location data along with information parsed from the image data (e.g., object-specific information). For instance, the contextual data may indicate (i) location data for the end-user device 602 at the time the wearable device 600 captured the image data and (ii) construction project-specific location data for the switch plate 612*a* (e.g., which may have been derived, for example, from floor plans or other project documentation identifying the switch plate 612*a*), based on which a location for the punch list item has been identified.

As further shown in FIG. 7, the visual representation 701 may include other information that was determined based on the contextual data and/or the supplemental contextual data, including information indicating a trade related to the new punch list item, a type of repair required for the new punch list item, a priority status for completing the new punch list item, and a due date for completing the new punch list item. Furthermore, as shown in FIG. 7, the visual representation 701 may be editable by a user associated with the respective end-user device at which the user interface view 700 is being displayed.

Advantageously, in the ways described above, the disclosed hardware and software technology provide improved technological solutions to existing technological approaches for documenting real-time observations. For instance, the disclosed hardware and software technology facilitates dynamic documentation of on-site observations and dynamic generation of data objects in real-time based on data captured by the disclosed wearable device, thereby reducing the need for construction professionals who are physical present on a construction site to document observations made on-site and manually create new data objects based on those observations. Notably, the new punch list item shown in FIG. 7 has been dynamically generated by the back-end computing platform using the appropriate tool within the construction management software application, automatically populated with the correct information for each of the data fields contained within a new punch item, and includes the relevant attachments to support the newly created punch list item.

Figure 8:
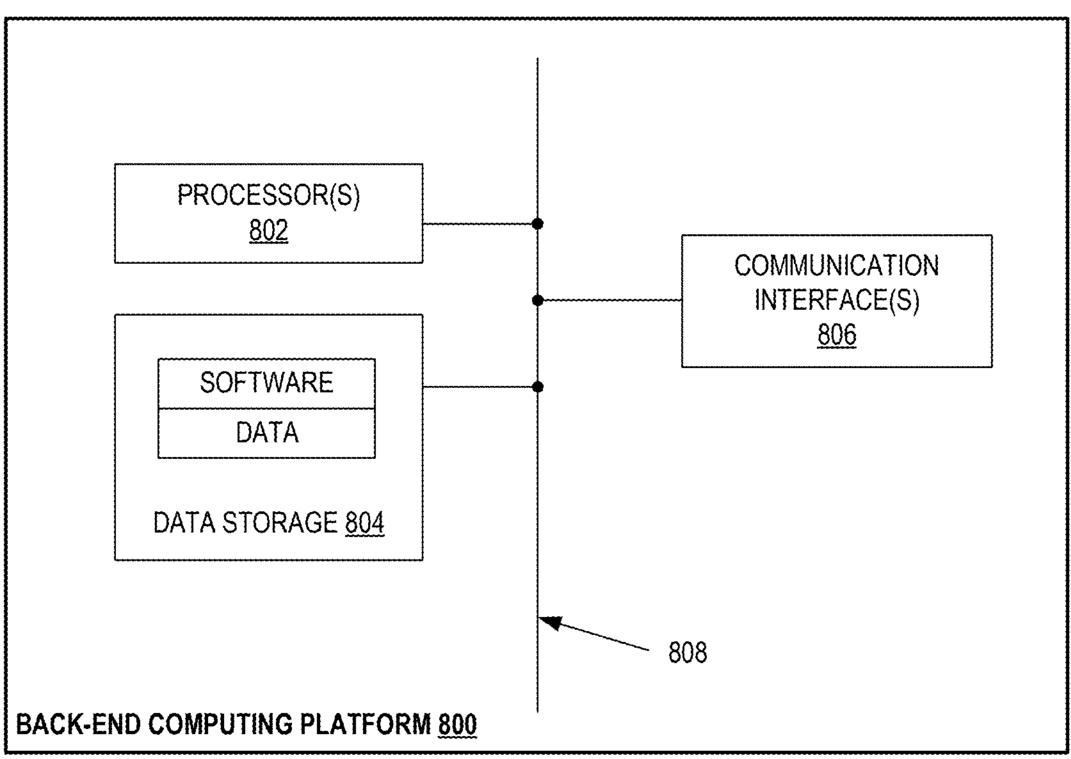
FIG. 8 depicts a diagram including structural components of an example back-end computing platform that may be configured to carry out one or more functions in accordance with aspects of the disclosed software technology.

Turning now to FIG. 8, a simplified block diagram is provided to illustrate some structural components that may be included in an example back-end computing platform 800 that may be configured to carry out any of the various functions disclosed herein, including but not limited to any of the back-end computing platform functionality disclosed herein and described above (e.g., the back-end computing platform functionality carried out by any of the back-end computing platforms 301, 401, or 601). At a high level, the example back-end computing platform 800 may generally comprise any one or more computing systems that collectively include one or more processors 802, data storage 804, and one or more communication interfaces 806, all of which may be communicatively linked by a communication link 808 that may take the form of a system bus, a communication network such as a public, private, or hybrid cloud, or some other connection mechanism. Each of these components may take various forms.

The one or more processors 802 may each comprise one or more processing components, such as general-purpose processors (e.g., a single- or a multi-core central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed. In line with the discussion above, it should also be understood that the one or more processors 802 could comprise processing components that are distributed across a plurality of physical computing systems connected via a network.

In turn, the data storage 804 may comprise one or more non-transitory computer-readable storage mediums that are collectively configured to store (i) program instructions that are executable by one or more processors 802 such that back-end computing platform 800 is configured to perform any of the various back-end functionality disclosed herein, and (ii) data that may be received, derived, or otherwise stored, for example, in one or more databases, file systems, repositories, or the like, by back-end computing platform 800, in connection with performing any of the various functions disclosed herein. In this respect, the one or more non-transitory computer-readable storage mediums of the data storage 804 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 804 may comprise computer-readable storage mediums that are distributed across a plurality of physical computing systems connected via a network.

The one or more communication interfaces 806 may be configured to facilitate wireless and/or wired communication with other systems and/or devices, such as one or more wearable devices and one or more end-user devices as described herein. Additionally, in an implementation where the back-end computing platform 800 comprises a plurality of physical computing systems connected via a network, the one or more communication interfaces 806 may be configured to facilitate wireless and/or wired communication between these physical computing systems (e.g., between computing and storage clusters in a cloud network). As such, the one or more communication interfaces 806 may each take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

Although not shown, the back-end computing platform 800 may additionally include or have an interface for connecting to one or more user-interface components that facilitate user interaction with the back-end computing platform 800, such as a keyboard, a mouse, a trackpad, a display screen, a touch-sensitive interface, a stylus, a virtual-reality headset, and/or one or more speaker components, among other possibilities.

It should be understood that the back-end computing platform 800 is one example of a computing platform that may be used with the embodiments described herein. Numerous other arrangements are possible and contemplated herein. For instance, in other embodiments, the back-end computing platform 800 may include additional components not pictured and/or more or fewer of the pictured components.

Figure 9:
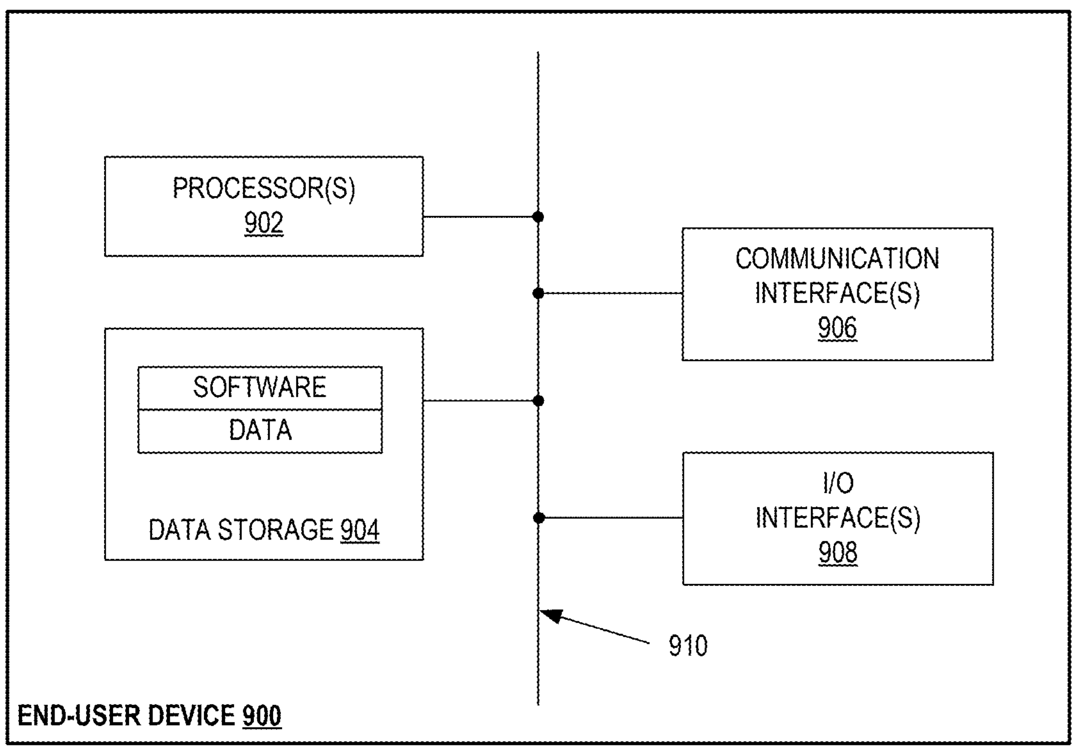
FIG. 9 depicts a diagram including structural components of an example end-user device that may be configured to carry out one or more functions in accordance with aspects of the disclosed software technology.

Turning next to FIG. 9, a simplified block diagram is provided to illustrate some structural components that may be included in an example end-user device 900 that may be configured to carry out any of the various functions disclosed herein, including but not limited to any of the end-user device functionality described above (e.g., the end-user device functionality carried out by any of the end-user devices 302, 402, or 602). As shown in FIG. 9, the end-user device 900 may include one or more processors 902, data storage 904, one or more communication interfaces 906, and one or more user-interface components 908, all of which may be communicatively linked by a communication link 910 that may take the form of a system bus or some other connection mechanism. Each of these components may take various forms.

The one or more processors 902 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

In turn, the data storage 904 may comprise one or more non-transitory computer-readable storage mediums that are collectively configured to store (i) program instructions that are executable by the processor(s) 902 such that the end-user device 900 is configured to perform certain functions related to interacting with a wearable device and a computing platform, and accessing services provided by a computing platform, and (ii) data that may be received, derived, or otherwise stored, for example, in one or more databases, file systems, repositories, or the like, by the end-user device 900, related to interacting with a wearable device and a computing platform and accessing services provided by a computing platform. In this respect, the one or more non-transitory computer-readable storage mediums of the data storage 904 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. The data storage 904 may take other forms and/or store data in other manners as well.

The one or more communication interfaces 906 may be configured to facilitate wireless and/or wired communication with other computing devices. The communication interface(s) 906 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The end-user device 900 may additionally include or have interfaces for one or more user-interface components 908 that facilitate user interaction with the end-user device 900, such as a keyboard, a mouse, a trackpad, a display screen, a touch-sensitive interface, a stylus, a virtual-reality headset, and/or one or more speaker components, among other possibilities.

It should be understood that the end-user device 900 is one example of an end-user device that may be used to interact with an example computing platform as described herein. Numerous other arrangements are possible and contemplated herein. For instance, in other embodiments, the end-user device 900 may include additional components not pictured and/or more or fewer of the pictured components.

CONCLUSION

This disclosure makes reference to the accompanying figures and several example embodiments of the disclosed innovations that have been described above. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

The invention claimed is:

1. A computing system comprising:
- an end-user device;
- a wearable computing device;
- at least one processor;
- at least one non-transitory computer-readable medium; and
- program instructions stored on the at least one non-transitory computer-readable medium that are executable by the at least one processor such that the computing system is configured to:
  - obtain, via a sensor system of the wearable computing device, (i) image data depicting one or more objects associated with a construction project and (ii) voice data indicating a request related to the one or more objects depicted in the image data;
  - determine, via the end-user device, contextual information related to the image data;
  - based on the voice data, identify the request, wherein the request comprises a request to generate a data object of a given type within a construction management software application;
  - based on the image data, the contextual information, and the request, generate a prompt that is to be provided as input to a generative AI model;
  - provide the prompt as input to the generative AI model;
  - based on the prompt, generate, via the generative AI model, a command for the construction management software application to generate the data object of the given type, wherein the data object of the given type comprises data related to the one or more objects depicted in the image data;
  - execute the command via the construction management software application and thereby generate the data object of the given type; and
  - cause a representation of the data object of the given type to be displayed via the end-user device.

2. The computing system of claim 1, wherein the contextual information includes information about a user account associated with the end-user device comprising one or more of (i) an individual associated with the user account, (ii) a role associated with the user account, or (iii) permissions information associated with the user account, and wherein the data object of the given type designates the individual associated with the user account as a party responsible for approving a task indicated by the data object.

3. The computing system of claim 1, wherein the contextual information includes location information indicating an on-site location of the construction project at which the end-user device was located when the image data was obtained, and wherein the data object of the given type indicates that the one or more objects depicted in the image data are located at the on-site location.

4. The computing system of claim 1, further comprising program instructions stored on the at least one non-transitory computer-readable medium that are executable by the at least one processor such that the computing system is configured to:
- determine, by a remote computing device, supplemental contextual information related to the image data, wherein the prompt for input to the generative AI model is generated based additionally on the supplemental contextual information.

5. The computing system of claim 4, wherein the supplemental contextual information includes information about (i) a given trade associated with the one or more objects depicted in the image data and (ii) information about an individual associated with the construction project that is responsible for performing work associated with the given trade, and wherein the data object of the given type designates the individual as an assignee of the data object of the given type.

6. The computing system of claim 5, further comprising:
- a remote computing device; and
- program instructions stored on the at least one non-transitory computer-readable medium that are executable by the at least one processor such that the remote computing device is configured to:
  - cause a second end-user device associated with the assignee to display the representation of the data object of the given type.

7. The computing system of claim 1, further comprising:
- a remote computing device; and
- program instructions stored on the at least one non-transitory computer-readable medium that are executable by the at least one processor such that the computing system is configured to:
  - transmit, from the wearable computing device to the end-user device, (i) the image data depicting the one or more objects and (ii) the voice data indicating the request related to the one or more objects depicted in the image data; and transmit, from the end-user device to the remote computing device, (i) the image data depicting the one or more objects and (ii) an indication of the request related to the one or more objects depicted in the image data.

8. The computing system of claim 1, further comprising a remote computing device, wherein:

the program instructions that are executable by the at least one processor such that the computing system is configured to generate the command for the construction management software application to generate the data object of the given type further comprise program instructions that are executable by the at least one processor such that the remote computing device is configured to:

based on the request, identify a given software tool provided by the construction management software application that facilitates creation of data objects of the given type; and the program instructions that are executable by the at least one processor such that the computing system is configured to execute the command and thereby generate the data object of the given type comprise program instructions that are executable by the at least one processor such that the remote computing device is configured to:

cause the given software tool to generate the data object of the given type, wherein the data object indicates the image data and the request.

9. The computing system of claim 1, further comprising a remote computing device, wherein the remote computing device comprises the generative AI model.

10. The computing system of claim 1, wherein the request related to the one or more objects depicted in the image data comprises a request to create a punch list item for a given object depicted in the image data, and wherein the data object of the given type comprises a new punch list item for the given object depicted in the image data.

11. The computing system of claim 1, further comprising program instructions stored on the at least one non-transitory computer-readable medium that are executable by the at least one processor such that the computing system is configured to:

cause the wearable computing device to output an audio notification indicating that the request related to the one or more objects depicted in the image data has been fulfilled.

12. A non-transitory computer-readable medium, wherein the non-transitory computer-readable medium is provisioned with program instructions that, when executed by at least one processor, cause a computing system to:

obtain, via a sensor system of a wearable computing device, (i) image data depicting one or more objects associated with a construction project and (ii) voice data indicating a request related to the one or more objects depicted in the image data;

determine, via an end-user device, contextual information related to the image data;

based on the voice data, identify the request, wherein the request comprises a request to generate a data object of a given type within a construction management software application;

based on the image data, the contextual information, and the request, generate a prompt that is to be provided as input to a generative AI model;

provide the prompt as input to the generative AI model;

based on the prompt, generate, via the generative AI model, a command for the construction management software application to generate the data object of the given type, wherein the data object of the given type comprises data related to the one or more objects depicted in the image data;

execute the command via the construction management software application and thereby generate the data object of the given type; and cause a representation of the data object of the given type to be displayed via the end-user device.

13. The non-transitory computer-readable medium of claim 12, wherein the contextual information includes information about a user account associated with the end-user device comprising one or more of (i) an individual associated with the user account, (ii) a role associated with the user account, or (iii) permissions information associated with the user account, and wherein the data object of the given type designates the individual associated with the user account as a party responsible for approving a task indicated by the data object.

14. The non-transitory computer-readable medium of claim 12, wherein the contextual information includes location information indicating an on-site location of the construction project at which the end-user device was located when the image data was obtained, and wherein the data object of the given type indicates that the one or more objects depicted in the image data are located at the on-site location.

15. The non-transitory computer-readable medium of claim 12, wherein the non-transitory computer-readable medium is also provisioned with program instructions that, when executed by the at least one processor, cause the computing system to:

determine, by a remote computing device, supplemental contextual information related to the image data, wherein the prompt for input to the generative AI model is generated based additionally on the supplemental contextual information.

16. The non-transitory computer-readable medium of claim 15, wherein the supplemental contextual information includes information about (i) a given trade associated with the one or more objects depicted in the image data and (ii) information about an individual associated with the construction project that is responsible for performing work associated with the given trade, and wherein the data object of the given type designates the individual as an assignee of the data object of the given type.

17. The non-transitory computer-readable medium of claim 16, wherein the non-transitory computer-readable medium is also provisioned with program instructions that, when executed by the at least one processor, cause the computing system to:

cause a second end-user device associated with the assignee to display the representation of the data object of the given type.

18. A method carried out by a computing system, the method comprising:

obtaining, via a sensor system of a wearable computing device, (i) image data depicting one or more objects associated with a construction project and (ii) voice data indicating a request related to the one or more objects depicted in the image data;

determining, via an end-user device, contextual information related to the image data;

based on the voice data, identifying the request, wherein the request comprises a request to generate a data object of a given type within a construction management software application;

based on the image data, the contextual information, and the request, generating a prompt that is to be provided as input to a generative AI model;

providing the prompt as input to the generative AI model;

based on the prompt, generating, via the generative AI model, a command for the construction management software application to generate the data object of the given type, wherein the data object of the given type comprises data related to the one or more objects depicted in the image data;

executing the command via the construction management software application and thereby generating the data object of the given type; and causing a representation of the data object of the given type to be displayed via the end-user device.

19. The method of claim 18, wherein the contextual information includes information about a user account associated with the end-user device comprising one or more of (i) an individual associated with the user account, (ii) a role associated with the user account, or (iii) permissions information associated with the user account, and wherein the data object of the given type designates the individual associated with the user account as a party responsible for approving a task indicated by the data object.

20. The method of claim 18, wherein the contextual information includes location information indicating an on-site location of the construction project at which the end-user device was located when the image data was obtained, and wherein the data object of the given type indicates that the one or more objects depicted in the image data are located at the on-site location.

* * * * *